Oct. 23, 1956  G. HOPPE  2,768,098
METHOD AND APPARATUS FOR PRECIPITATING METAL FROM THE
VAPOROUS STATE ONTO PLATES, PARTICULARLY FOR THE
PRODUCTION OF SELENIUM COATED RECTIFIER PLATES
Filed Sept. 7, 1951  5 Sheets-Sheet 4
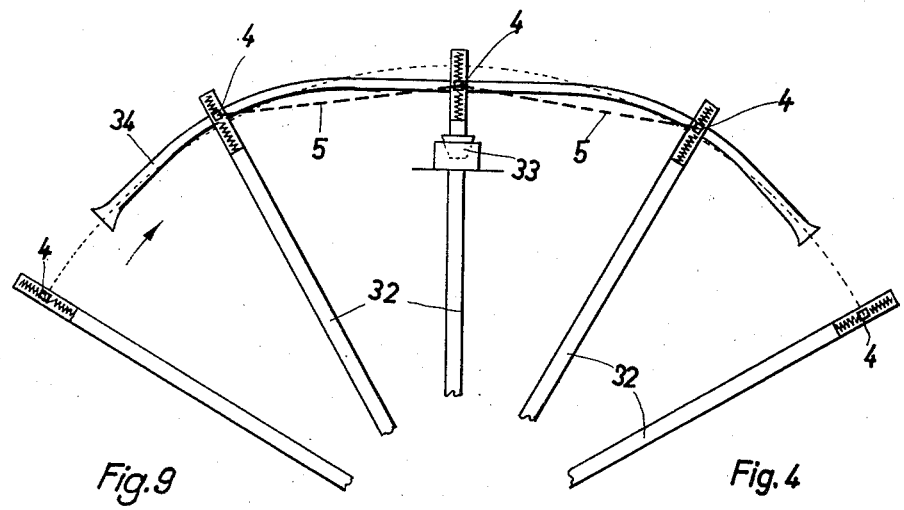
Fig. 9    Fig. 4
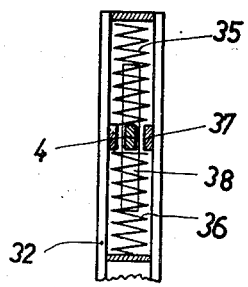
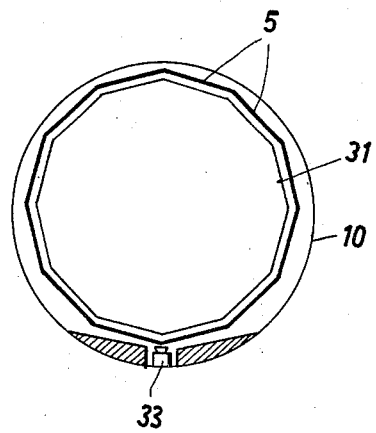
Fig. 5    Fig. 6
Inventor:
Georg Hoppe
By C. M. Avery
Attorney Oct. 23, 1956　　　　　G. HOPPE　　　　　2,768,098
METHOD AND APPARATUS FOR PRECIPITATING METAL FROM THE
VAPOROUS STATE ONTO PLATES, PARTICULARLY FOR THE
PRODUCTION OF SELENIUM COATED RECTIFIER PLATES
Filed Sept. 7, 1951　　　　　　　　　　　5 Sheets-Sheet 5

Inventor:
Georg Hoppe
By C. M. Amy
Attorney

United States Patent Office 2,768,098
Patented Oct. 23, 1956

2,768,098

METHOD AND APPARATUS FOR PRECIPITATING METAL FROM THE VAPOROUS STATE ONTO PLATES, PARTICULARLY FOR THE PRODUCTION OF SELENIUM COATED RECTIFIER PLATES

Georg Hoppe, Helmbrechts, Bavaria, Germany, assignor to Siemens-Schuckertwerke Aktiengesellschaft, Berlin-Siemensstadt, Germany, a corporation of Germany Application September 7, 1951, Serial No. 245,498

Claims priority, application Germany September 12, 1950

17 Claims. (Cl. 117—200)

My invention relates to methods and apparatus for precipitating metal from the vaporous state onto plates, particularly for the production of selenium-coated plates for barrier-layer rectifiers.

In the manufacture of barrier-layer rectifiers, the vapo-precipitation of metal, for instance, selenium, onto the discs, pellets or other plate members to be coated has been carried out by moving the metal-containing vaporizing vessel back and forth beneath the stationary plate until the metal vapors arising from the vessel and precipitating onto the underside of the plate produce a coating of the desired thickness. In most cases, this process requires operating in a technical vacuum, i. e., at a very low absolute pressure. It is therefore necessary to accommodate the vaporization devices within a recipient, a sufficient evacuation of such a recipient being the more difficult the larger its volume. For that reason, the known devices with movable vaporizing vessels permit the simultaneous processing of only small plate surfaces or of only a few plates to be coated, as the drive means for moving the electrically heated vaporizer vessels and the devices for heating the plates involve considerable space requirements within the recipient.

Besides, the known methods and apparatus are liable to produce non-uniform precipitation coatings due to the fact that, with a reciprocating movement of the vaporizer vessels, the individual points of the plate surface are exposed to the precipitating vapor during unequal intervals of time. As a result, the crystalline texture of the precipitated coating may easily become non-uniform. To alleviate the non-uniformities at the reversing points of the vaporizer movements, it has been proposed to place these points outside the areas to be coated by having the vaporizer move a sufficient amount beyond the surface of the plate being processed. This not only requires an uneconomical enlargement of the recipient space to be evacuated, but also results in wasting a considerable percentage of the often expensive vaporizing metal.

It is an object of my invention to provide methods and apparatus for the vapor-precipitation of metal, particularly of selenium for the manufacture of barrier-layer rectifiers, which are capable of producing a completely uniform precipitation-coating of a larger number of plates or other parts than could heretofore be processed within the same vacuum space; and it is also an object to afford the just-mentioned advantage under conditions securing a practically complete utilization of the vaporized metal.

To this end, and in accordance with the method of my invention, the plate members to be coated are passed along the vaporization place at a uniform speed and in a uniform direction, preferably repeatedly and in substantially equal intervals of time. For giving the precipitated coating a crystalline texture of optimum uniformity, another feature of my invention involves heating the plates to an approximately constant temperature during the entire processing including the travel periods between successive vaporization passes. Since thus a cooling and reheating between passes is avoided, the otherwise possible detrimental thermal influences on the precipitated metal coating are minimized or eliminated.

According to another feature of my invention, an apparatus for performing the above-mentioned method comprises an endless conveyor device, preferably disposed within a vacuum recipient, with a series of releasable holding means for accommodating the plate members to be processed. Disposed near the conveyor device is a vaporization device with one or more heatable troughs or the like vessels for the selenium or other metal to be vaporized. The troughs extend over the entire length of the plates to be coated.

These vaporizing troughs according to another feature of my invention, are stationarily disposed within the space encompassed by the endless conveyor device. For instance, the troughs are arranged beneath the upper portion of the conveyor path, or they may also be located outside the conveyor device and beneath the lowest portion of its path of travel.

According to a further feature of my invention, the conveyor device comprises a carrier frame rotatable about a horizontal axis and equipped with holding means for a multiplicity of plates to be coated, these holding means having a polygonal arrangement along the periphery of the frame structure. The shaft of the frame structure may be mounted on a vertical plate structure which may also serve as a base plate for the bell portion of a vacuum recipient. While in the known apparatus for the vaporization coating of plates, the recipient bell was hinged, apparatus according to the invention are preferably designed for withdrawal of the bell by translatory horizontal motion, the bell being guided on rails or guides by means of rollers.

Instead of providing a rotating carrier frame, other endless conveyor devices, for instance a conveyor chain, may be employed for moving the plates to be coated in a uniform direction along the vaporization place. In all these cases, the heating devices for maintaining the plates at the proper temperature is preferably so arranged that the plates are subjected to a uniform heat radiation along the entire path of travel. The heating device may consist, for instance, of an electric heater as generally known for metal vaporization equipment.

According to another feature of the invention, the electric heater, comprising one or several heating conductors, has its turns wound with a substantially uniform mutual spacing upon a polygonal supporting frame which is attached to the inner wall of the recipient bell so as to concentrically surround the plate-carrying conveyor device when the recipient is closed. However, the heater may also be located within the space encompassed by the conveyor and may either be stationary or rotatable together with the plates, the spacing between the heating elements and the plates being in accordance with the particular heating requirements. Such an arrangement is preferable when the vapor precipitation occurs from the outside of the conveyor arrangement, and it has the advantage that the coated plates are freely accessible and may readily be exchanged when the recipient is opened. When providing a conveyor device with a chain or belt member, a similar arrangement of the heating elements may be employed.

The foregoing and other objects, advantages and features of the invention will be apparent from the following description of the embodiments of the invention exemplified by the drawing in which:

Fig. 4 shows part of a modified conveyor structure for apparatus according to the invention, comprising guide means for passing the plates to be coated at a uniform distance along the vaporizing place;

Figure 7:
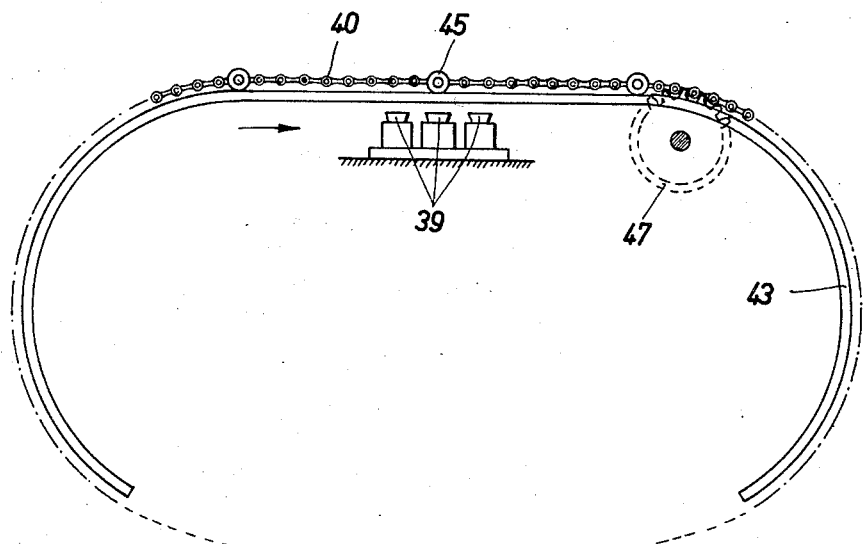
Figure 8:
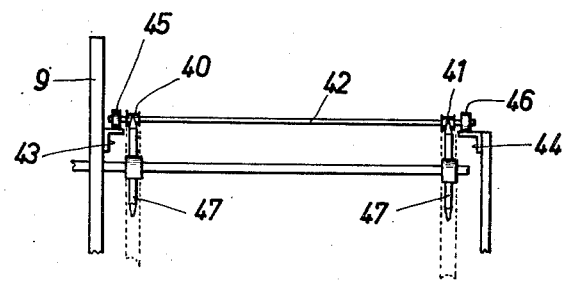

Fig. 5 relates to the embodiment of Fig. 4 and shows a detail of the plate-carrying conveyor structure;

Fig. 6 shows schematically a cross section of vaporizing apparatus with plate heating means disposed within the conveyor space;

Fig. 7 shows schematically an apparatus with a chain-type conveyor;

Fig. 8 is a partial cross section through the conveyor device according to Fig. 7;

Fig. 9 is a partial view of a modified conveyor structure equipped with magnetic means for holding the plates to be processed; while Figs. 10 and 11 show a cross section and a top view of a permanent holding magnet pertaining to the structure of Fig. 9.

Figure 1:
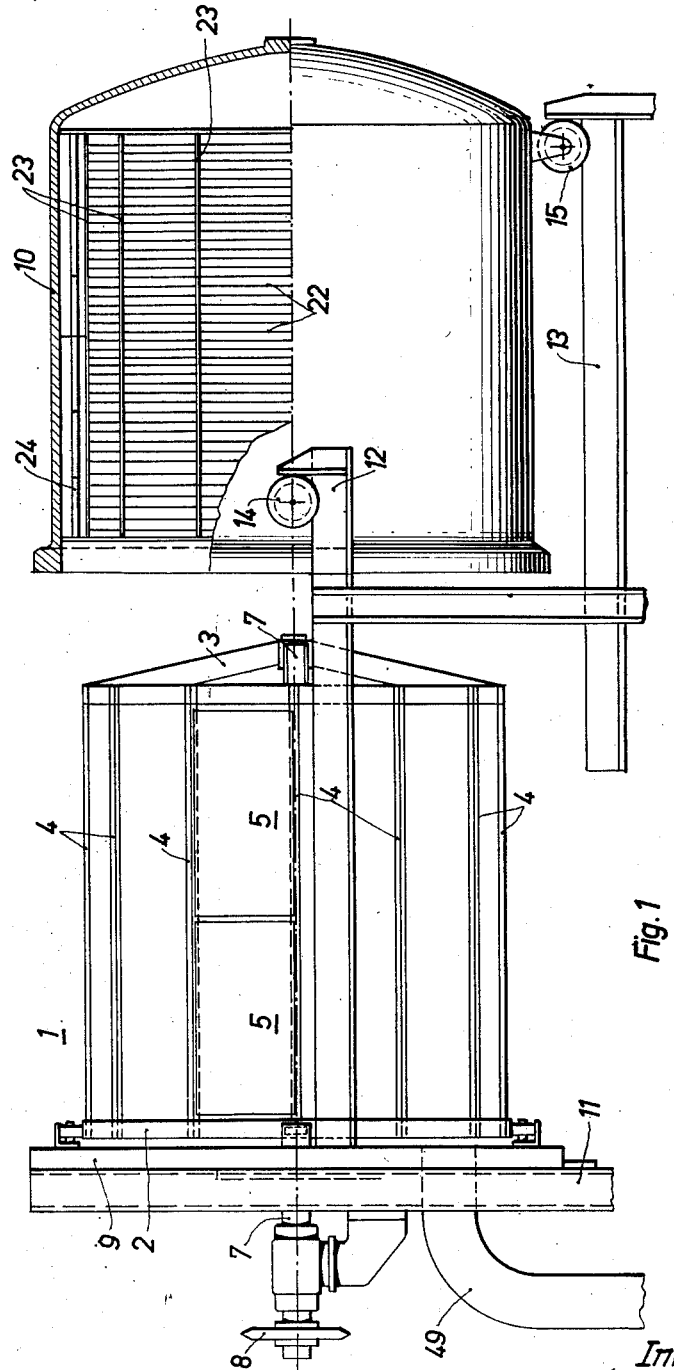
Fig. 1 is a side view of an apparatus with a rotatable carrier frame, the bell structure of the pertaining vacuum recipient being shown withdrawn and partly in cross section.
Figure 2:
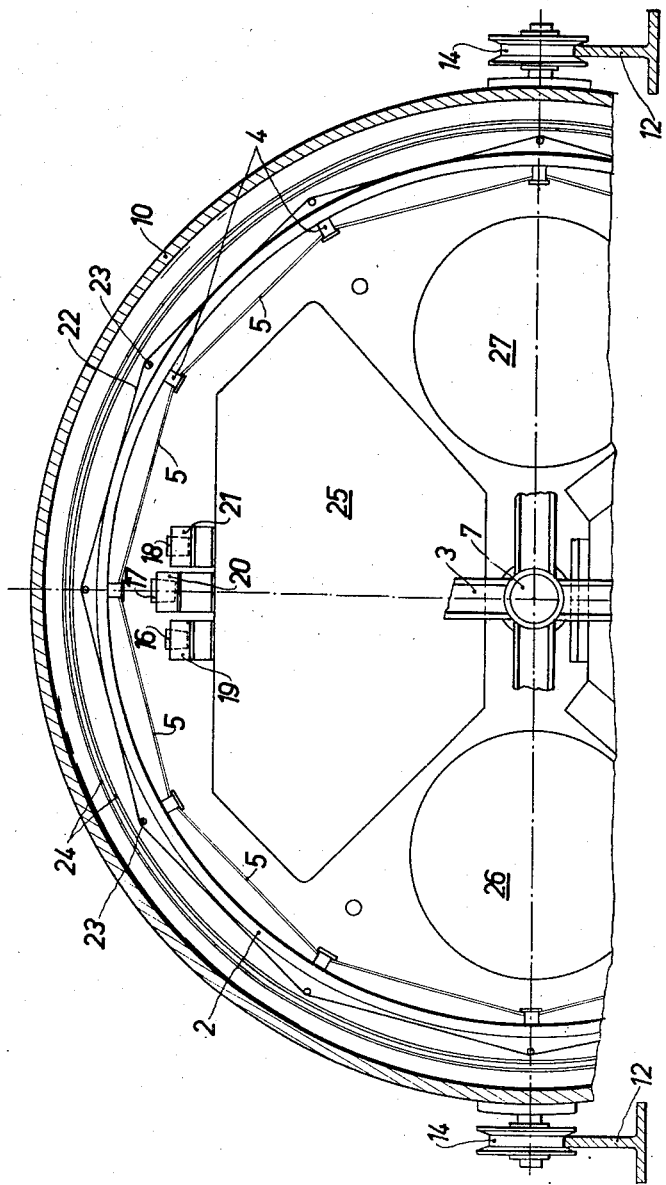
Fig. 2 is a partial cross section through the apparatus of Fig. 1, showing the recipient bell in closed position.
Figure 3:
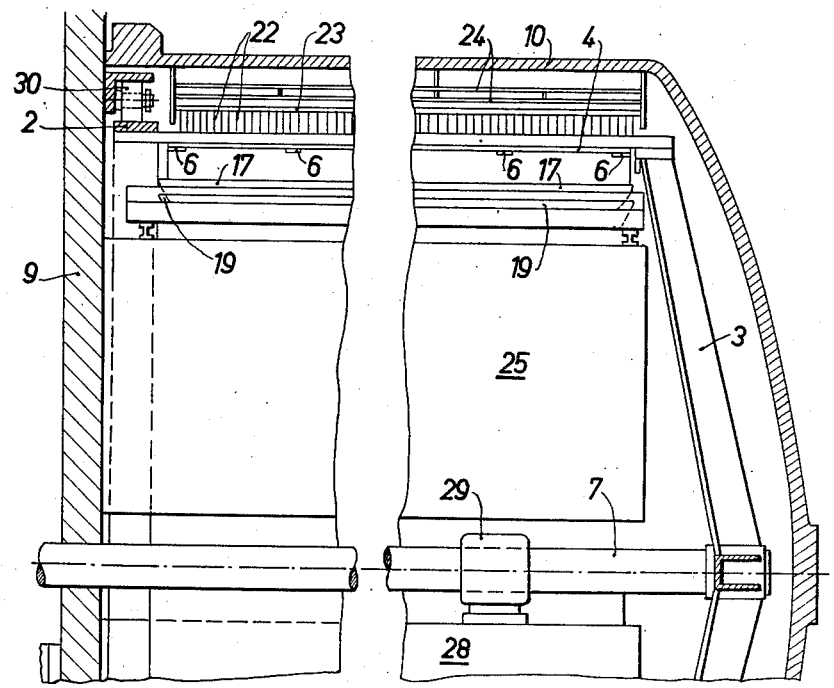
Fig. 3 is a fragmentary axial section through the same apparatus.

The apparatus illustrated in Figs. 1 to 3 has a conveyor device comprising a drum-type carrier frame rotatable about a horizontal axis. The carrier frame has a ring 2 and a supporting spider 3 joined together by a number of holding rods 4 which are uniformly distributed over the frame periphery in a twelve-cornered arrangement. The plates 5 to be processed are to be mounted on the rods 4 so as to form a closed dodecagon when the frame structure is fully charged. For attachment of the plates 5 to the holder rods 4, these rods carry individual mechanical or magnetical holding parts 6 which overlap the plates only at individual marginal points without appreciably obstructing the plate surface to be coated.

The spider 3 is mounted on a shaft 7 which, at the outside of the apparatus, carries a drive gear or sprocket 8 to be driven at constant speed. The shaft 7 traverses a bore in the base plate 9 of a recipient. The recipient bell 10, when closed, is tightly seated against the base plate and completely encloses the rotatable frame structure of the conveyor. A vacuum seal (not illustrated) is to be provided between shaft 7 and base plate 9 in the customary manner. Joined with the base plate 11 is a suction pipe 49 for connection to a vacuum pump. A suitable mounting structure 11 is also connected with the base plate 9 for supporting the entire apparatus. The receptacle bell 10 has rollers 14, 15 supported on horizontal guide rails 12, 13 which facilitate withdrawing and closing the bell. The rails 12 are firmly secured to the base plate 9, the rail 13 being also rigidly joined with the plate 9 through the common supporting structure.

In apparatus according to Figs. 1 to 3 the vapor-precipitation coating of the polygonally arranged plates 5 is effected from within the rotating carrier frame. The vaporization device is located at a suitable distance below the highest point of the polygonal arrangement. In the illustrated example, three elongated vaporization troughs 16, 17, 18, mounted in electrically heated containers 19, 20, 21, respectively, extend parallel to each other over the entire length of the plates to be processed. In this embodiment the carrier frame is equipped for accommodating two coaxial rows of plates so that a total of 24 plates may be processed together. Two groups of vaporizing troughs 16, 17, 18 may be placed one behind the other. Instead of three vaporizing troughs mounted at different heights, only one or more than three troughs may be used.

When the shaft 7 and the conveyor frame 1 are being driven, the individual plates 5 travel at uniform speed and in a uniform direction along the vaporizing troughs 16, 17, 18 so that all parts of the individual plates are exposed to the metal vapor under the same conditions. Besides, the vaporization-coating of the individual plate surface areas is repeated in equal intervals of time so that a uniform formation of the precipitated metal coating is secured.

For heating the plates during processing, the illustrated apparatus has an electric heating device which concentrically surrounds the entire polygonal arrangement of the plates 5. The heating device comprises one or several electrically parallel heating conductors 22 which are wound upon a supporting frame formed of insulating rods 23 that are also arranged on a polygon. The insulating structure is attached to the inside of the recipient bell 10. Preferably an insulating jacket is inserted between the heating device 22, 23 and the wall of the bell 10. The insulating jacket may consist of one or more cylindrical shells 24 of sheet metal, ceramic material, or the like. When withdrawing the bell, the heating equipment is likewise removed so that the plates on the carrier frame are freely accessible for exchange.

The heating device keeps the plates at an elevated constant temperature along their entire path of travel and during the entire processing period. Electric current is supplied to the heater by flexible cables or, if desired, by a plug coupling or other contact device which closes the electric circuit only when the bell 10 is placed against the base plate 9.

Disposed within the remaining spaces encompassed by the carrier frame are several filler bodies 25 to 28 which minimize the recipient volume to be evacuated and are mounted on the base plate 9 of the receptacle. These bodies may consist of tightly welded hollow bodies. As illustrated, the upper filler body 25 may also serve as a support for the vaporizing devices 16 to 21, while the lowermost filler body 28 may carry a supporting bearing 29 for the shaft 7.

The ring 2 is preferably designed to serve as a rail for engagement by rollers 30 journalled on the base plate 9. With such a design, the shaft 7 is subjected to the weight of the carrier frame only at the supporting bearing 29.

The shaft 7 may be omitted if the carrier frame 1 is equipped with one or more additional concentric rails supported by stationarily journalled rollers and if one or several of these rollers are driven from the outside. The driven roller and the pertaining circular rail may then have intermeshing gear teeth. With such a design of the driving means, the spider portion 3 may be eliminated if desired, because it is then no longer called upon to impart driving motion to the peripheral portion of the conveyor device.

With an arrangement of the heating means as shown in Figs. 1 to 3, a portion of the heating energy produced by the heating elements may be lost. A more economical utilization of the heating energy is obtained if the heating elements are disposed within the endless path of the plates 5 to be coated. For instance, a favorable design is obtained by placing the vaporizing device outside and beneath the closed path of plate travel as shown schematically in Fig. 6.

In Fig. 6 the position of the recipient bell 10 is schematically indicated, and the plates 5 to be coated are shown only by a representation of the entire polygonal arrangement, all details of the rotating frame structure being omitted. The electric heater 31 is arranged within the space encircled by the plates 5 and forms a polygon adapted to that of the plate arrangement, the spacing between heater and plates being everywhere the same. The heater is mounted on the plate-carrying frame structure and hence rotates together therewith. The vaporization coating of the plates is effected from below by means of one or several vaporizing troughs 33.

Reverting to Fig. 2, it will be recognized that in the illustrated apparatus the distance of the plates from the vaporizing troughs 16 to 18 varies during each pass of a plate, being somewhat larger at the front and rear edges of the plate than in the center. In order to maintain the spacing equal at all points of the plate surface during each vaporizing passage, for thus further improving the uniformity of precipitation, the plates to be coated may be tiltably mounted on the carrier frame for cooperation with a control device which tilts the plates in the necessary position during each processing pass.

The embodiment shown in Figs. 4 and 5 incorporates the just-mentioned feature. Fig. 4 shows only a portion of a modified conveyor frame structure otherwise arranged and operated in accordance with the embodiment of Figs. 1 to 3 previously described. In the frame structure according to Fig. 4, the holding rods 4 for supporting the plates 5 to be coated are mounted at their respective ends on the radial arms 32 of respective rotatable spoke wheels or spiders. The mounting is movable so that each holding rod 4 may shift radially along the adjacent spider arms 32 in opposition to biasing springs tending to normally hold the bar in centered position. During the passage of each rod 4 through the precipitation zone of the stationarily mounted vaporizing device 33, the two rod ends enter into respective curved guides 34 of a stationary control device. The guides 34 are so shaped that the rods 4 are radially shifted with the effect that the distance of the plates 5 from the vaporizing device 33 remains constant while the plates are passing through the precipitation zone.

As apparent from Fig. 5, each end of each holding rod 4 is guided in a radial slot 38 of the pertaining spider arm 32 and is biased at radially opposite sides by respective helical compression springs 35 and 36 which normally hold the rod 4 in a mid-position where the springs abut against rigid stops 37 of the arm 32. This normal position of the holding rods 4 is maintained during the lower, major portion of the conveyor travel. When the ends of a holding rod 4 enter into the guides 34, the rod is displaced against the action of spring 35 or 36 upwardly or downwardly along the slot 38 dependent upon the cam configuration of the control guides. This configuration is so chosen that the mutual spacing between adjacent holding bars 4 remains constant. That is, when the leading rod 4 is displaced inwardly from its normal position, the following rod 4 is displaced upwardly a corresponding amount, and vice versa.

It will be understood that the displaceable mounting of the plate holding means according to Figs. 4 and 5 is presented only by way of example and may be given any other suitable design permitting the explained maintenance of constant spacing between plates and vaporizing device during the precipitation passages. For instance, the plates may be made tiltable by other mounting means and may be controlled by stationary dog pins, or cams and the like to secure the desired constancy of spacing.

There is also the possibility of mounting the vaporizing troughs on a vertically reciprocable support and controlling the support, for instance by cams, to maintain a constant distance from all points of the plates while the plates are passing by the trough.

In the embodiment according to Figs. 7 and 8, the conveyor device for accommodating and moving the plates to be coated comprises an endless conveyor chain. This has the advantage that the path of conveyor travel can be given a plane portion near the vaporization place so that additional means for securing a constant spacing of the travelling plates from the vaporization device need not be provided. According to Fig. 7, for instance, the circulatory travel path is essentially oval shaped but includes, above the vaporization troughs 39, a completely plane and horizontal portion.

As apparent from Fig. 8, the illustrated conveyor device is equipped with two endless chains 40 and 41 which are interconnected by holding rods 42 mounted between respective opposite links or pivots of the chains. The rods 42 are spaced from each other in accordance with the width of the plates to be accommodated. Stationary rails 43, 44 serve for guiding the conveyor chain. The pertaining rollers 45, 46 of the chain structure may be journalled on the ends of the holding rods 42. A pair of sprockets 47, mounted on a common drive shaft, serves for advancing the chain at constant speed, the sprocket shaft being driven from the outside of the apparatus. The conveyor chain may hang down any desirable distance below the guide rails and, if desired, may follow an extended path of travel, involving one or more detours, to accommodate a larger number of plates to be processed. In apparatus of this kind, the remaining spaces within the evacuatable container or recipient may be minimized by the provision of filler bodies as described previously. The heating of the plates may be effected by means of heating elements arranged parallel to the conveyor path, these heating means being mounted within the recipient bell similar to the design described with reference to Figs. 1 to 3; or the heating device may be given a stationary arrangement within the path of conveyor travel or beneath the guide rails 33, 44 in analogy to the mounting shown in Fig. 6. The cross section of the recipient bell may be adapted to the path of plate travel.

The holding rods 42 may be equipped with plate holding means, similar to those of the embodiment of Figs. 1 to 3, which grip the plates only at individual points with a slight mutual overlapping so that both plate surfaces are obstructed as slightly as possible against the effects of the vaporizing and heating devices. For minimizing the remaining amount of obstruction or for eliminating it completely, the holding means can be given a magnetical design. For instance, in cases where the plates to be coated consist of magnetizable material, the plates may be attached to the conveyor device with the aid of several permanent magnets.

Fig. 9 represents an example of such magnetic holding means. According to this embodiment, the plates 5 to be coated are secured to the conveyor device by means of three permanent holding magnets 50 mounted on each of the respective holding rods 4 of the conveyor. Numerals 48 and 49 denote part of the conveyor structure, for instance two arms of a supporting spider on which the cross-connected holding bars 4 are mounted in a polygonal arrangement substantially as described previously in conjunction with the embodiment of Figs. 1 to 3. The permanent magnets 50 are preferably cup shaped as shown in Figs. 10 and 11. One pole of each magnet body is formed by a cylindrical ring portion 51, while the other pole consists of a central boss portion 52 which is magnetically joined with portion 51 at the bottom of the magnet body. The annular gap 53 between the two magnet poles may be filled by a magnetically non-conducting material, for instance, by a copper ring. Such a simple holding device makes it possible to readily assemble and disassemble the plates 5 to be processed on the rotatable conveyor device without requiring any mechanical holding means to be released for effecting an exchange and without incurring any obstruction of the surface areas to be coated.

It will be obvious to those skilled in the art upon a study of this disclosure that my invention permits of various modifications other than those specifically illustrated and described, without departure from the essence of the invention and within the scope of the claims annexed hereto.

I claim:

1. The method of vaporizing selenium onto plates in the manufacturing of dry rectifiers, which comprises passing the plates in one direction and at uniform speed over a source of selenium vapor to allow selenium precipitation on the plates, thereafter moving said plates beyond the precipitating range of said source of selenium vapor for a given period of time, during which time period the vapor precipitated on the plates will crystallize, and then repeating the foregoing steps continuously until the total thickness of the successively precipitated and crystallized layers has reached the desired thickness.

2. The method of vaporizing selenium onto plates in the manufacturing of dry rectifiers, which comprises passing the plates in one direction and at uniform speed over a source of selenium vapor to allow selenium precipitation on the plates, thereafter moving said plates beyond the precipitating range of said source of selenium vapor for a given period of time sufficient for the precipitated selenium to crystallize, and then repeating the foregoing steps continuously until the total thickness of the successively precipitated and crystallized layers has reached the desired thickness, the temperature of said plates being kept substantially the same during said vapor precipitating and vapor crystallizing steps.

3. The method of producing a uniform metal coating on plates, which comprises locally vaporizing the coating metal, and repeatedly passing the plates in the same direction and at a uniform speed along the vaporization locality while maintaining said plates at a uniform vertical distance from the metal being vaporized to intermittently collect a metal precipitate, the temperature of said plates being maintained at an even temperature below the melting temperature of selenium during said entire precipitation process.

4. Apparatus for the coating of plates by precipitating thereon a metal from the vaporous state, comprising a vacuum chamber, an endless conveyor device for plates to be coated, means to move said conveyor device at a uniform travelling speed and direction in said chamber, said conveyor device having sequentially arranged holding means for carrying plates to be coated, metal vaporizing trough means disposed in said chamber near said conveyor device and extending at right angles with respect to the path of plate travel, and means for maintaining the vertical distance between said plates and said metal vaporizing trough constant as said plates are carried by said conveyor device past said vaporizing trough means.

5. Apparatus according to claim 4, said vaporizing means comprising an elongated trough disposed below the path of said conveyor device, said holding means being disposed at the underside of said device where it passes by said trough member.

6. Apparatus according to claim 4, comprising an electric heater extending over the entire length of the plates to be precipitation-coated and over substantially the entire length of their path of travel.

7. In apparatus according to claim 4, said plate holding means being magnetical.

8. Apparatus according to claim 4, comprising filler bodies disposed in said vacuum chamber and occupying vacant space to reduce the evacuatable volume.

9. Apparatus for precipitating a metal coating from the vaporous state onto plates, comprising a vacuum chamber, a rotatable frame structure within said chamber, means providing a horizonally disposed and rotatable shaft within said chamber, said structure being coaxially mounted on said shaft, a multiplicity of holders for plates to be coated, said holders being mounted in a polygonal arrangement on the peripheral portion of said frame structure, and metal vaporizing means disposed within said frame structure and extending transversely across the entire width of the path of plate travel.

10. Apparatus according to claim 9, said vacuum chamber comprising a vertical base plate and a bell member horizontally withdrawable from said base plate, said vertical base plate comprising said shaft providing means.

11. Apparatus according to claim 10, said bell member having supporting means, and stationary horizontal rails engaged by said supporting means for guiding said bell member.

12. Apparatus according to claim 9, said vacuum chamber comprising a vertical base plate and a bell member horizontally withdrawable from said base plate, a wire-holding structure mounted on said bell member at the inner peripheral wall thereof, and an electric heating wire having a plurality of turns being mounted on said wire-holding structure of said bell member.

13. Apparatus according to claim 9, said rotatable frame structure having a concentric annular rail, and stationarily journalled rollers in engagement with said rail.

14. Apparatus according to claim 9, said holders being radially displaceable relative to said rotatable frame structure, and stationary guide means extending along part of the travel path of said holders and being engageable therewith in the vicinity of said vaporizing means for maintaining the plates at a substantially constant distance from said vaporizing means.

15. Apparatus for precipitating a metal coating from the vaporous state onto plates, comprising a vacuum chamber, an endless conveyor device within said vacuum chamber, metal vaporizing means disposed in the space encompassed by said device and extending transversely across the width of said device at a place near the underside of the conveyor, and a multiplicity of holding means for accommodating the plates to be precipitation-coated, said holding means being mounted on said device in peripherally spaced relation to one another and having plate-engaging parts at the inside of said device, and means to move said conveyor device at uniform speed past said metal vaporizing means, said plate-engaging parts including means to allow exchanging the plates from the outside of said conveyor device.

16. Apparatus for precipitating a metal coating from the vaporous state onto plates, comprising a vacuum chamber, an endless conveyor device having sequentially arranged holding means for plates to be coated located within said chamber, means to move said conveyor device together with said held plates at a uniform speed and direction in said chamber, and metal vaporizing means disposed near said conveyor device and extending transversely across the entire width of the path of plate travel, said holding means having plate tilting means, and a control device disposed near the place of said vaporizing means and engageable with said tilting means for maintaining the plates at a substantially constant distance from said vaporizing means when the plates are passing by said vaporizing means.

17. Apparatus according to claim 16, said control device comprising a stationary guide engageable with said tilting means along a limited path of travel of said conveyor device.

References Cited in the file of this patent

UNITED STATES PATENTS

| 1,758,531 | Pfanhauser | May 13, 1930 |
| 2,260,471 | McLeod | Oct. 28, 1941 |
| 2,313,410 | Walther | Mar. 9, 1943 |
| 2,337,329 | Hewlett | Dec. 21, 1943 |
| 2,339,613 | Becker et al. | Jan. 18, 1944 |
| 2,344,138 | Drummond | Mar. 14, 1944 |
| 2,369,764 | Ullrich | Feb. 20, 1945 |
| 2,456,241 | Axler et al. | Dec. 14, 1948 |
| 2,532,971 | Van Leer et al. | Dec. 5, 1950 |
| 2,508,500 | DeLange et al. | May 23, 1950 |
| 2,508,509 | Germer et al. | May 23, 1950 |
| 2,561,077 | Tilton | July 17, 1951 |